(12) United States Patent
Henaire et al.

(10) Patent No.: US 10,771,823 B1
(45) Date of Patent: Sep. 8, 2020

(54) PRESENTATION OF COMPOSITE STREAMS TO USERS

(71) Applicant: Facebook, Inc., Menlo Park, CA (US)

(72) Inventors: Mathieu R. Henaire, Redmond, WA (US); Amit Puntambekar, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/264,474

(22) Filed: Jan. 31, 2019

Related U.S. Application Data

(63) Continuation of application No. 15/396,090, filed on Dec. 30, 2016, now Pat. No. 10,237,581.

(51) Int. Cl.
| | |
|---|---|
| *H04N 21/00* | (2011.01) |
| *H04N 5/445* | (2011.01) |
| *H04N 7/14* | (2006.01) |
| *H04L 29/06* | (2006.01) |
| *H04N 21/2187* | (2011.01) |
| *H04L 29/08* | (2006.01) |
| *H04N 21/482* | (2011.01) |

(Continued)

(52) U.S. Cl.
CPC ....... *H04N 21/2187* (2013.01); *H04L 65/601* (2013.01); *H04L 65/605* (2013.01); *H04L 67/2823* (2013.01); *H04N 21/236* (2013.01); *H04N 21/2353* (2013.01); *H04N 21/2368* (2013.01); *H04N 21/482* (2013.01); *H04L 65/4069* (2013.01)

(58) Field of Classification Search
CPC ............. H04N 21/2187; H04N 21/236; H04N 21/482; H04N 21/2368; H04N 21/2353; H04L 65/605; H04L 65/601; H04L 67/2823; H04L 65/4069
USPC ........................................................ 725/116
See application file for complete search history.

(56) References Cited

U.S. PATENT DOCUMENTS 8,291,452 B1 * 10/2012 Yong .................. H04N 21/4782
725/41
2009/0031384 A1   1/2009 Brooks et al.
(Continued)

OTHER PUBLICATIONS

United States Office Action, U.S. Appl. No. 15/396,064, dated Sep. 9, 2019, 26 pages.

(Continued)

*Primary Examiner* — Susan E. Hodges
(74) *Attorney, Agent, or Firm* — Fenwick & West LLP

(57) ABSTRACT

An online system receives a media stream from a host of a live broadcasting stream and a second media stream from a guest of the host, and generates a single composite stream that includes the multiple live streams. The online system decodes and aligns the video and audio frames of each live stream to ensure that the composite stream displays the multiple live streams in a synchronized fashion. Additionally, the composite stream can display the multiple live streams in a particular format (e.g. side-by-side, or picture-in-picture), and therefore, the online system adjusts the video and audio frames of each live stream to fit that format. For each composite stream, the online system employs a decision engine that identifies the optimal set of encoded composite streams based on a variety of characteristics. The online system encodes the composite stream and distributes the appropriately encoded composite stream to client devices for display to viewers.

20 Claims, 6 Drawing Sheets

(51) Int. Cl.
     *H04N 21/2368*    (2011.01)
     *H04N 21/235*      (2011.01)
     *H04N 21/236*      (2011.01)

(56) References Cited

U.S. PATENT DOCUMENTS

| | | |
|---|---|---|
| 2010/0195977 A1 | 8/2010 | Bennett et al. |
| 2010/0321469 A1 | 12/2010 | Jeong et al. |
| 2012/0054809 A1 | 3/2012 | Chowdhury et al. |
| 2012/0078997 A1 | 3/2012 | Evans et al. |
| 2012/0079126 A1 | 3/2012 | Evans et al. |
| 2012/0131146 A1 | 5/2012 | Choi et al. |
| 2012/0246677 A1 | 9/2012 | Fasting |
| 2013/0173819 A1 | 7/2013 | Lee et al. |
| 2014/0032658 A1 | 1/2014 | Falls |
| 2014/0098850 A1 | 4/2014 | Wolfram et al. |
| 2014/0165116 A1 | 6/2014 | Major et al. |
| 2014/0274358 A1 | 9/2014 | Hoskins et al. |
| 2014/0376609 A1 | 12/2014 | Barkley et al. |
| 2015/0024839 A1 | 1/2015 | Zahn et al. |
| 2015/0199996 A1 | 7/2015 | Krishnamurthy et al. |
| 2015/0222815 A1 | 8/2015 | Wang et al. |
| 2016/0150184 A1 | 5/2016 | Gandhi |
| 2016/0173736 A1 | 6/2016 | Kniazev et al. |
| 2018/0270524 A1 | 9/2018 | Jones et al. |

OTHER PUBLICATIONS

United States Office Action, U.S. Appl. No. 16/293,342, dated Nov. 27, 2019, nine pages.
United States Office Action, U.S. Appl. No. 16/293,342, dated Jun. 2, 2020, 10 pages.

\* cited by examiner

PRESENTATION OF COMPOSITE STREAMS TO USERS

CROSS REFERENCE TO RELATED APPLICATIONS

This application is a continuation of co-pending U.S. application Ser. No. 15/396,090, filed Dec. 30, 2016, which is incorporated by reference in its entirety.

BACKGROUND

This disclosure generally relates to content streams, and more specifically to creating, by an online system, a composite stream derived from two or more individual streams to be transmitted to client devices.

Live media content streams are increasingly popular today given that they serve as a convenient method for stream hosts to provide interesting content to their viewers in real-time. Stream hosts can gain significant popularity by live-streaming content that is of interest to many users. Today, many stream hosts are collaborating with one another such that a first stream host can create a stream and invite a second stream host as a guest. Therefore, the two stream hosts can create content that can appeal to both of their viewerships. As an example, the two stream hosts can live stream a conversation about a trending subject that is of interest to their viewers.

However, a live stream that includes two stream hosts is now composed of two different streams which presents a unique set of problems. For example, the two different streams may have very different settings (e.g. encodings, video/audio settings, targeted recipient client devices) because they originate from different media sources. Therefore, a composite stream, if inappropriately processed, risks being poorly received by viewers. Thus, online systems for generating the single live stream that includes streams from two different stream hosts challenged to appropriately handle the generation and transmission of the single live stream while consuming a manageable amount of computational resources.

SUMMARY

An online system serves as a platform that enables multiple media stream sources (e.g. stream hosts) to transmit live streams to viewers. In this case, the online system receives a first live stream and a second live stream from a first source and second source, respectively. The first and second live streams are intended to be presented to viewers as a single, unified composite stream. Therefore, the online system appropriately generates a composite stream from the first and second live streams that, when displayed by a client device, does not degrade the viewing experience of viewers.

More specifically, the online system processes the received first and second live streams according to standard multimedia streaming protocols. The online system can decode the video and audio portions of each live stream to generate video/audio in an intermediate uncompressed or decoded format (e.g., YUV for video and PCM for audio). The appropriate decoders are selected by the online system because each live stream may have undergone a different encoding process that was conducted by its respective source.

Once in an intermediate decoded format, the video and audio data from the first and second live streams can be edited by the online system. For example, the online system retrieves timing information associated with each live stream and aligns the video/audio frames from the first stream with the video/audio frames from the second stream to ensure that the composite stream displays both live streams in a synchronized fashion. Additionally, the online system may decide that the composite video is to display the first and second live streams in a particular presentation format (e.g., picture-in-picture format or a side-by-side format). Therefore, the online system additionally adjusts (e.g. crop, change video resolution, change audio bitrate) one or both of the first and second live streams to ensure that the appearance of the composite stream is consistent.

Once the composite stream is generated, the online system selects appropriate encoders to encode the composite stream. Given that encoding video and audio content for a live stream that is suitable for playing back for a variety of client devices is expensive, in various embodiments, the online system can employ a variety of techniques in order to identify an optimal set of encoders to encode the composite stream. Therefore, instead of using all possible encoders to generate a separate encoded composite stream, the online system can select a subset of encoders. For example, the online system can employ a decision engine that retrieves characteristics from the first or second source that respectively provided the first and second live streams, from the client devices that are requesting to access the composite stream, and additional characteristics that altogether, influence the final set of encodings that would be required.

The online system distributes the encoded composite stream to various client devices for consumption by a viewer of the client device. To the viewer, the composite stream appears to be a single live stream with the same settings (e.g. video resolution, audio bitrate) as opposed to two separate streams that have simply been merged into a single composite stream with variable settings. Additionally, this single composite live stream, when transmitted by the online system to the viewer's client devices, requires significantly reduced bandwidth as compared to transmitting both the first and second streams individually.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Overview of System Environment

Figure 1:
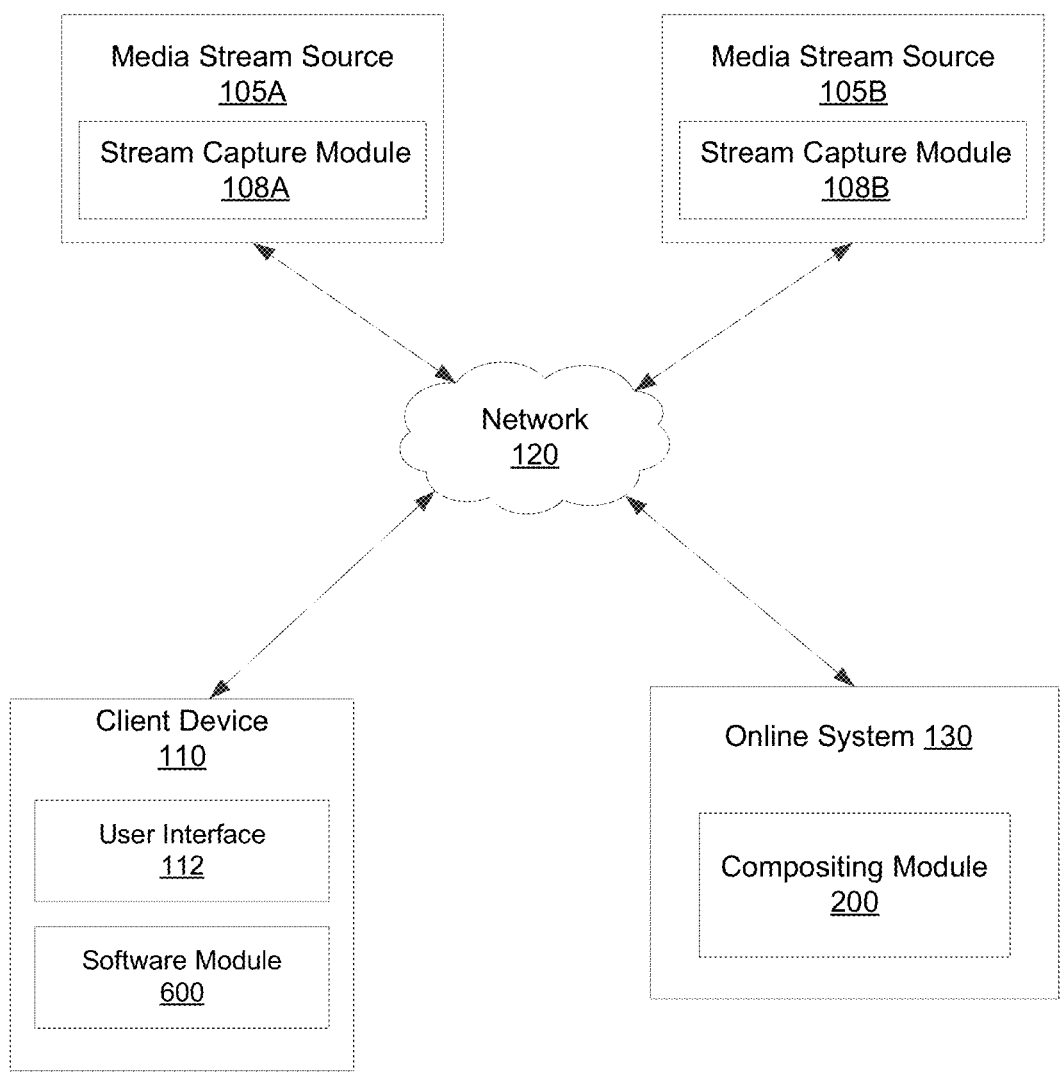
FIG. 1 illustrates a system environment for presenting a composited stream to users of an online system, in accordance with an embodiment.

FIG. 1 illustrates a system environment 100 for presenting a composited stream to users of an online system, in accordance with an embodiment. The system environment 100 includes one or more media stream sources 105, one or more client devices 110 connected through a network 120 to an online system 130 including a compositing module 200. Although the system environment 100 depicts two media stream sources 105a and 105b and one client device 110, there may be any number of media stream sources 105 and client devices 110 connected to the online system 130.

FIG. 1 and the other figures use like reference numerals to identify like elements. A letter after a reference numeral, such as "105a," indicates that the text refers specifically to the element having that particular reference numeral. A reference numeral in the text without a following letter, such as "105," refers to any or all of the elements in the figures bearing that reference numeral (e.g. "105" in the text refers to reference numerals "105a" and/or "105b" in the figures).

Each media stream source 105 records a multimedia stream (e.g. a live stream) and provides the stream to the online system 130 through the network 120. Each media stream source 105 includes a stream capture module 108 that captures a stream. For example, the stream capture module 108 is a processor coupled to an optical device (e.g. camera) that records video and audio information. Additionally, the stream capture module 108 may capture the stream based on intrinsic characteristics of the media stream source 105. For example, the media stream source 105 may be a laptop with a camera with a pre-determined resolution (e.g., 640×360 pixels) and a microphone with a predetermined recording bitrate (e.g., 8-529 kbits/second for stereo sound). In another example, the media stream source 105 may be a client device 110 such as a mobile cell phone. Therefore, the intrinsic characteristics may be fixed based on the platform (e.g. iOS™, Android™, Windows' Phone) that the mobile device is running.

In various embodiments, the media stream source 105 belongs to an individual or entity that is responsible for creating the stream. The individual may be a user of the online system 130. In other words, the individual may have a user profile stored on the online system 130 that identifies the individual. When the user creates a live stream on the media stream source 105 and sends the live stream to the online system 130, his/her user profile may be associated with the live stream.

The media stream source 105 encodes the media stream according to configurations of the media stream source 105. In various embodiments, the media stream source 105 separately encodes the video and the audio components of the media stream. For example, in regards to the video of the media stream, the user may select an appropriate video setting (e.g. resolution of 720p, 1080p) which instructs the media stream source 105 to process the video of the media stream according to the user selected video resolution. Therefore, the media stream source 105 selects an encoder to encode the video based on the user selected setting (720p, 1080p) and retrieves the appropriate application programming interface (API) to process the video. Any suitable video coding protocols, e.g., H.264 video coding, can be used by the media stream source 105 to encode the video of the media stream.

In regards to the audio of the media stream, the user may select an appropriate audio setting (e.g. bit rate, mono/stereo sound). Thus, the media stream source 105 encodes the audio based on the selected audio setting. For example, the media stream source 105 may, by default, select the advanced audio coding (AAC) lossy audio compression format as the audio encoder. In various embodiments, if the user selects a high bit rate and wants to maintain the quality of the audio in the stream, the media stream source 105 can select audio interchange file format (AIFF) or other audio encoders (e.g. lossless encoders) that ensures the high quality of the audio stream.

After encoding the video and audio of the media stream, the media stream source 105 sends the encoded media stream through the network 120 to the online system 130 to be transmitted to one or more client devices 110. In various embodiments, the media stream source 105 includes generated metadata information of the encoded media stream that includes the encoders that were used to encode the video and audio of the media stream, and compression formats (e.g., H.264 for video and AAC for audio) for encoding the media stream. In other embodiments, the media stream source 105 also sends characteristics of the media stream source (e.g. device identifier, camera specifications) to aid the online system 130 in the process of transmitting the encoded media stream to one or more client devices 110.

The online system 130 receives one or more media streams from the media stream sources 105, generates a composite stream from the one or more streams, and transmits the composite stream to client devices 110 so that a user of the client device 110 can view the composite stream. In various embodiments, the online system 130 receives, through the network 120, a first encoded media stream (e.g., a video and corresponding audio streams) from a first media stream source 105A and a second encoded media stream from a second media stream source 105B. For example, the creator of the first media stream may invite the creator of the second media stream as a guest to a media stream that is to be presented to the users of the client devices 110. Thus, the online system 130 generates a composite stream derived from the combined first and second media streams as the media stream to be presented to the users of the client devices 110. In various embodiments, the online system 130 includes a compositing module 200 that handles the process of compositing the multiple media streams received from the first media stream source 105A and the second media stream source 105B.

A composite stream, composed from a first media stream and a second media stream, is presented in a particular display configuration. As one example, a composite stream presents the first media stream and the second media stream adjacent to one another. Therefore, a viewer can equally view content from both the first and second media streams. As another example, the composite stream presents the first and second media stream in a picture-in-picture configuration, e.g., the videos frames from the guest's video stream inside the video frames from the stream originator's video stream or vice versa. Once the composite stream is generated, the online system 130 appropriately encodes the composite stream and transmits the encoded composite stream to a client device 110. Thus, a user of the client device 110 can consume the composite stream that includes both the first and second media streams.

In various embodiments, the online system 130 may be a social networking system that maintains a social graph of users. For example, the individuals that use the media stream sources 105 to provide a live stream and the individuals that use client devices 110 to access a composite stream are registered users of the online system 130. The online system 130 stores the registered users as nodes in a social graph maintained by the online system 130. Additionally, a first user and a second user that are connected (e.g. friends) on the online system 130 have a stored edge that connects the nodes that represent the first and second users in the social graph. Nodes can further include objects of the social networking system, such as web pages embodying concepts and entities and edges may represent a connection between any two nodes.

A client device 110 is a computing device capable of receiving the composite stream from the online system 130 through the network 120 and playing back the composite stream to a user of the client device 110. Examples of client devices 110 include desktop computers, laptop computers, tablet computers (pads), mobile phones, personal digital assistants (PDAs), gaming devices, or any other electronic device including computing functionality and data communication capabilities. In various embodiments, a client device 110 also includes a user interface 112 that is configured to receive user inputs from a user of the client device 110. For example, the user interface 112 may be a touchscreen that the user of the client device 110 can use to login to the online system 130 and access his/her user profile that is stored on the online system 130. In another example, a user can use the user interface 112 of the client device 110 to request to access a composite stream transmitted by the online system 130. In various embodiments, the client device 110 includes a software module 600 that is responsible for playing back the composite stream. For example, the software module 600 appropriately decodes the video and audio components of the composite stream and plays back the decoded composite stream on the user interface 112 of the client device 110.

The network 120 facilitates communications among one or more client devices 110, the online system 130. The network 10 may be any wired or wireless local area network (LAN) and/or wide area network (WAN), such as an intranet, an extranet, or the Internet. In various embodiments, the network 120 uses standard communication technologies and/or protocols. Examples of technologies used by the network 120 include Ethernet, 802.11, 3G, 4G, 802.16, or any other suitable communication technology. The network 120 may use wireless, wired, or a combination of wireless and wired communication technologies. Examples of protocols used by the network 120 include transmission control protocol/Internet protocol (TCP/IP), hypertext transport protocol (HTTP), simple mail transfer protocol (SMTP), file transfer protocol (TCP), or any other suitable communication protocol.

Generating a Composite Stream by the Online System

Figure 2:
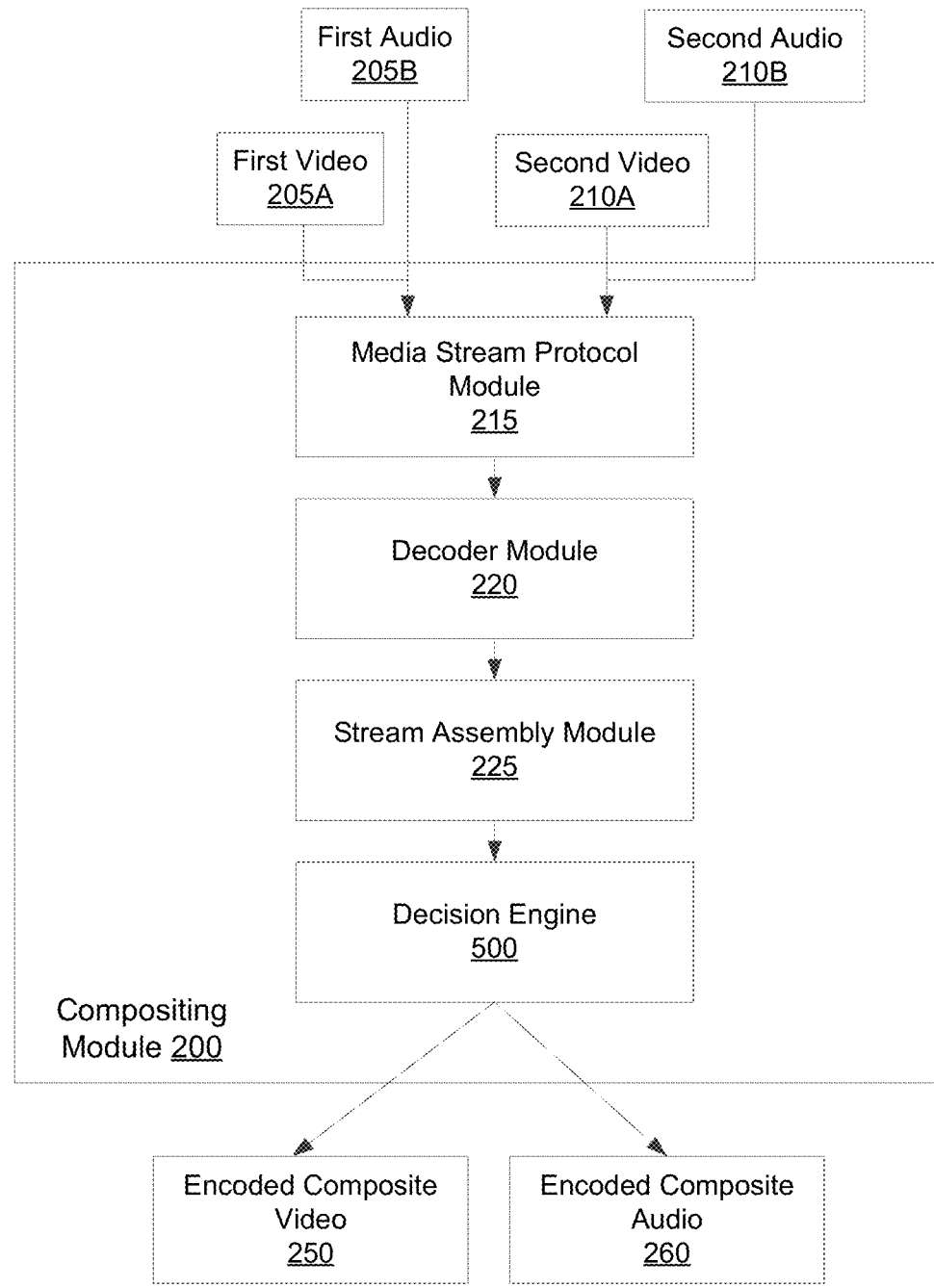
FIG. 2 illustrates a flow diagram for the compositing module of the online system, in accordance with an embodiment.

FIG. 2 illustrates a flow diagram for the compositing module 200 of the online system 130, in accordance with an embodiment. In various embodiments, the compositing module 200 includes a media stream protocol module 215, a decoder module 220, a stream assembly module 225, and a decision engine 500. Further reference will be made in regards to FIG. 3 which illustrates a visual representation of the compositing of a first media stream and second media stream into a composite stream, in accordance with an embodiment.

The compositing module 200 receives multiple streams from one or more media stream sources 105. As illustrated in FIG. 2, the compositing module 200 receives a first media stream that includes a first video 205A and a first audio 205B. Additionally, the compositing module 200 receives a second media stream that includes a second video 210A and a second audio 210B. In various embodiments, the first media stream and second media stream originate from a first media stream source 105A and a second media stream source 105B, respectively. As previously described, each video (205A and 210A) and each audio (205B and 210B) may be previously encoded (e.g. by the media stream source 105) according to settings or configurations associated with the media stream source 105.

Figure 3:
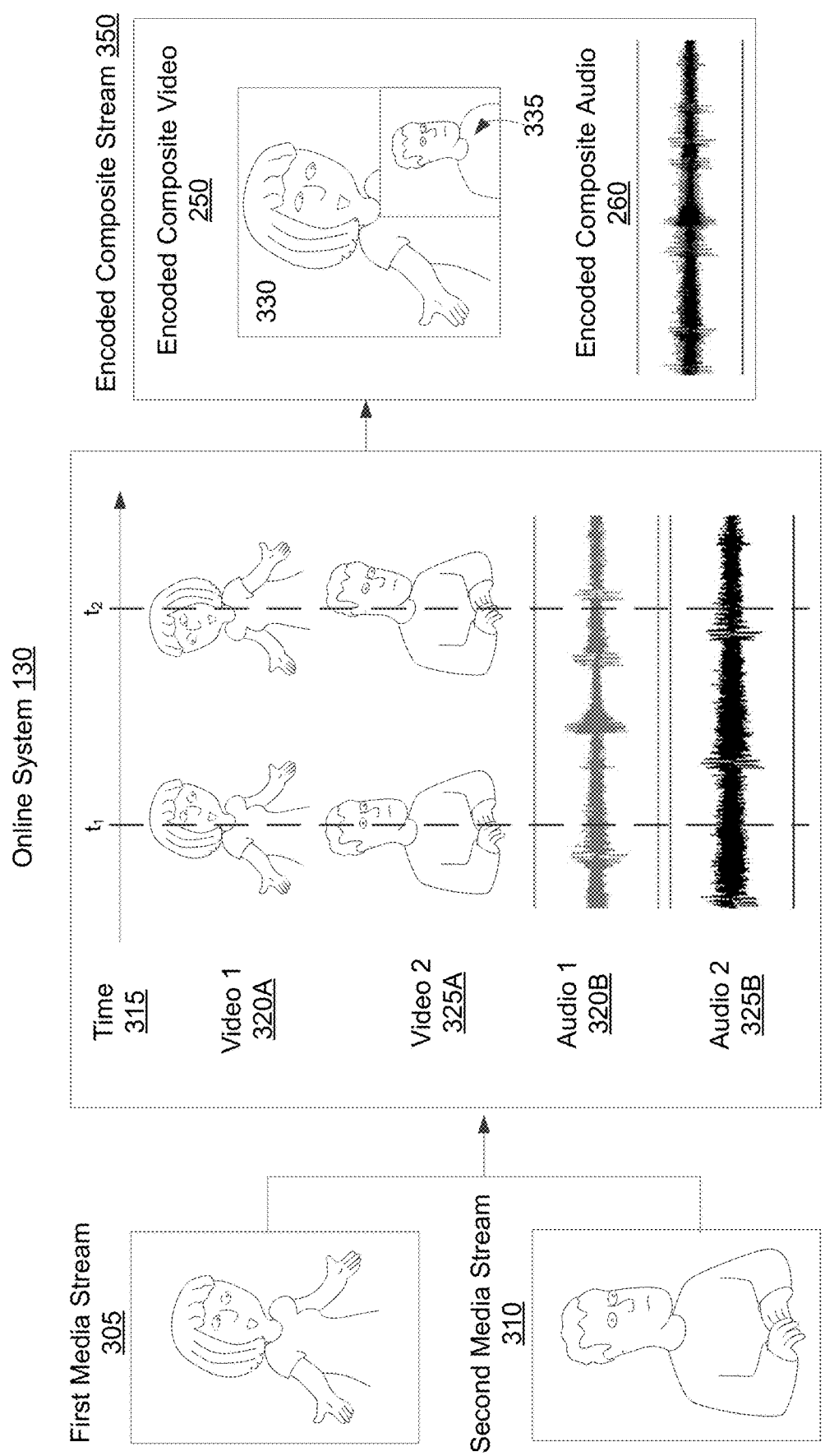
FIG. 3 illustrates a visual representation of the compositing of a first media stream and second media stream into a composite stream, in accordance with an embodiment.

FIG. 3 depicts an example of the first media stream 305 and second media stream 310 as well as the process of assembling the multiple media streams into a composite stream. For example, the first media stream 305 includes a video depicting a female individual whereas the second media stream 310 includes a video depicting a male individual. Additionally, the first media stream 305 and second media stream 310 may also include associated audio component with the video stream.

Returning to FIG. 2, the media stream protocol module 215 of the compositing module 200 receives the video and audio data according to designated multimedia network protocols. For example, a designated protocol may be a real time transport protocol (RTP) over universal datagram protocol (UDP). When using UDP, the media stream protocol module 215 may be configured to receive the data packets corresponding to the video and audio of each media stream. In various embodiments, the data packets may be identifiably tagged (e.g., each data packet having a packet number in a sequence of data packets) such that the media stream protocol module 215 may re-sequence the data packets if they are received out of order. In other embodiments, the media stream protocol module 215 may skip over data packets that are lost while in transmission from the one or more media stream sources 105. In other embodiments, the designated protocol may be a real-time messaging protocol (RTMP) over transmission control protocol (TCP). Thus, the media stream protocol module 215 ensures that no data packets are lost in transmission. After receiving the respective video and audio data of the media streams, the media stream protocol module 215 sends them to the decoder module 220 for decoding.

Although the embodiments are described herein for two (or more) media streams, the media stream protocol module 215 can be further configured to receive a single media stream if only a single media stream (e.g. only a first video 205A and a first audio 205B) is to be transmitted by the online system 130. In other words, a composite stream need not be generated if there is only a single host that is live-streaming a stream. This scenario may occur after the creation of the live stream by the first media stream source 105A (e.g. a host) and before the second media stream source 105B (e.g. a guest) joins the live stream. In this scenario, the media stream protocol module 215 may direct the received media stream directly to the decision engine 500 to be distributed to one or more client devices 110. In other embodiments, the media stream protocol module 215 may direct the received media stream to the decoder module 220 and the decision engine 500 in order to be transcoded. Thus, the online system 130 can save resources by skipping over certain modules (e.g. stream assembly module 225) that would not be required for a single media stream.

The decoder module 220 receives and decodes the video and audio data of the multiple media streams into decoded media data, e.g., YUV video data and PCM audio data. In one embodiment, the decoded video and audio of a media stream are same as the original raw video and audio data before being encoded by the media stream source 105 if a lossless encoding scheme is used to encode the media stream. In another embodiment, the decoded video and audio of a media stream are similar to the original raw video and audio data before being encoded by the media stream source 105 if a lossy encoding scheme is used to encode the media stream. To appropriately do so, the decoder module 220 may receive associated metadata information associated with each video and audio file of a media stream that specifies the encoder that was previously used to encode each file. For example, a media stream source 105 may have previously encoded a video using a H.264 encoder and an associated audio file using AAC encoding. Therefore, the metadata information specifies these encoders such that the decoder module 220 may retrieve the H.264 and AAC decoder to appropriately decode the video and audio files, respectively, to an intermediate format.

In various embodiments, the first and second media streams originate from different media stream sources 105 with different coding configurations. For example, the video and audio from each media stream may have been previously encoded using different encoders, due to different configurations of the media stream sources 105 (e.g. camera/video resolution, audio bit rate). Thus, the decoder module 220 identifies and applies the appropriate decoder to each received video and audio to generate decoded video and audio data for the stream assembly module 225.

The stream assembly module 225 receives the decoded video data and decoded audio data files and assembles them into a composite video file and composite audio file. In various embodiments, the stream assembly module 225 assembles a variety of different composite videos that have different configurations. A configuration of the composite stream may specify the positioning and/or orientation of the first and second media streams within the composite stream (e.g. a side-by-side or picture-in-picture orientation). As a visual example, FIG. 3 depicts the encoded composite stream 350 that specifies a picture-in-picture orientation where the video frame from the first media stream 305 is placed as a larger picture 330. Additionally, the video frame from the second media stream 310 is placed as a smaller picture 335 that is overlaid in the bottom right corner of the larger picture 330. Therefore, users of client devices 110 can view the composite stream and its media sources for the composition, e.g., the first and second media streams.

As another example, a configuration may specify the final resolution of the composite video stream (e.g. 720p, 1080p, 4K resolution). The final desired resolution may be dependent on the resolution of the first video stream and second video stream. For example, the final required resolution may be set as the lower of the two resolutions of the two video streams to ensure that the composite stream can be transmitted and played back as a single media stream by client devices 110 with lower resolution display screens. In other embodiments, the required resolution may be independent of the resolutions of the first and second video streams. For example, the required resolution is preset at a resolution lower than both the first and second video streams in accordance with a client device's current downloading network bandwidth. The stream assembly module 225 can achieve the final resolution of the composite video by lowering the resolution of the first and/or second videos, cropping the first and/or second videos, or a combination of both.

Referring to FIG. 3 as a specific example, a first media stream 305 and second media stream 310 may each have video resolutions with an aspect ratio of 16:9 (e.g. 1280×720 pixels). However, the composite video is to be generated as a picture-in-picture composite video where both the first picture 330 and second picture 330 each have an aspect ratio of 1:1. Therefore, the stream assembly module 225 may crop and lower the resolution of both the first 330 and second picture 335 to fit the desired resolution of the composite video. For example, the second media stream 310 has been slightly cropped at the bottom to only depict a headshot of the male individual in the smaller picture 335 of the picture-in-picture composite stream.

In some embodiments, the decoded video and audio received by the stream assembly module 225 may each have associated timing information. Referring to FIG. 3, the stream assembly module 225 may receive time 315 information that indicates specific time instances (e.g. $t_1$ and $t_2$) that are associated with video 1 (320A), video 2 (325A), audio 1 (320B), and audio 2 (325B). To simplify the description of one embodiment of the stream assembly module 225 and for illustration purposes only, the video and audio data are illustrated by corresponding video frames and audio frames of the media streams received by the compositing module 200. For example, a first video frame of video 1 (320A) (e.g. female individual looking to the right) is to be played at time $t_1$ whereas the second video frame (e.g. female individual looking to the left) is to be played at time $t_2$. Similarly, an audio excerpt from audio 1 (320B) may be played at time $t_1$ for a duration of $t_2-t_1$. In various embodiments, the timing information may originate from the media stream source 105 and is encoded along with the video and audio of the original media stream.

In various embodiments, the stream assembly module 225 aligns each stream based on their timing information. In one embodiment, the alignment is performed during the composition phase of live broadcasting the composite stream; in another embodiment, the alignment is performed after live broadcasting the composite stream, e.g., for video on demand streaming services. For example, the stream assembly module 225 identifies the video frames from the first and second videos that are each to be played at time $t_1$. In parallel, the stream assembly module 225 identifies the audio excerpt from the first and second audio stream that are each to be played at time $t_1$. The stream assembly module 225 continues and evaluates the remainder time points to align the videos and audios from the first and second media streams.

In various embodiments, the video frames from the video and audio excerpts from the first media stream and the second media stream do not perfectly match at a particular time instance. This may arise from differences in the configurations (e.g., different machine clocks used by different operating systems) of the first media stream source 105A and second media stream source 105B. For example, a video frame from a first video stream is to be played at a time $t_1$. Additionally, the video frame from a second video stream is to be played at a time $t_1+\Delta t$. The stream assembly module 225 determines the value of $\Delta t$, the timing difference between the video frame of the first video stream and the video frame of the second video frame, and compares it to a threshold time difference. In various embodiments, the threshold time difference is preset by the online system 130. The threshold may be determined based on empirical evidence. For example, users may be asked to view composite videos and to detect whether there are noticeable time delays between the first and second streams in the composite stream. The threshold time difference can be set to a value such that the time delay between two videos that correspond to the threshold time difference is not noticeable.

If $\Delta t$ is below the threshold time difference, the stream assembly module 225 disregards the time difference between the video frame of the first video and the video frame of the second video aligns them at the time $t_1$. Alternatively, if $\Delta t$ is above the threshold, the stream assembly module 225 may choose to include or disregard the video frame from the first video stream associated with a play time of $\Delta t$. Thus, the stream assembly module 225 may look at the next video frame from the first video stream that is associated with a time that is closer to $t_1+\Delta t$. As an example, a video frame from the first stream may correspond to t=1 second. A video frame from the second stream that is closest to t=1 second may correspond to t=1.025 seconds (e.g. due to a packet loss or due to different configurations of the media stream source). The difference of 0.025 seconds may be above the time threshold. Therefore, the stream assembly module 225 may check the subsequent video frame of the first video which corresponds to t=1.02. Here, the difference between this subsequent video frame of the first video and the video frame of the second video (e.g. at t=1.025) is now $\Delta t$=0.025. If this falls below the threshold time, these two video frames are now deemed aligned. Thus, the video frame from the second video may be associated with t=1.02 seconds as opposed to t=1.025 seconds. In this scenario, the composite video may only have a video frame from the first video stream that is to be played at t=1 second. In another scenario, the composite video may not have a video frame from either the first or second source that is to be played at t=1 second because the video frame was disregarded. Therefore, the stream assembly module 225 may choose to repeat a previous video frame to be played at t=1 second to ensure continuity in the composite stream.

In various embodiments, when assembling composite audio excerpts from the first and second audio streams, the stream assembly module 225 does not individually alter the timing information associated with audio excerpts from either the first or second audio streams or simply overlays the two audio excerpts to generate a composite audio stream. In other embodiments, the stream assembly module 225 may alter the timing information associated with an audio excerpt to reflect any changes in the timing of the video frames. For example, returning to the prior example where the video frame of the second video is shifted from t=1.025 seconds to t=1 second, the corresponding audio excerpt may also be shifted from t=1.025 seconds to t=1 second, to ensure alignment of the video and the audio from the second media stream. The stream assembly module 225 may interleave the first and second audio streams to form the composite audio.

Referring back to FIG. 2, the decision engine 500 receives the composite stream from the stream assembly module 225 and decides the different types of encodings that are required for the composite stream. For example, the decision engine 500 may decide that a composite stream needs a wide set of content encodings (e.g. different video/audio formats, different video resolutions, different audio bitrates) because the media stream source 105 is very popular and will likely be accessed by a wide variety of client devices 110. In another example, the decision engine 500 may decide that a composite stream needs a limited set of content encodings because the media stream source 105 typically only has a limited number of client devices 110 that access the stream, or the composite stream is to be streamed to client devices 110 located in a geographical location that is known for limited network bandwidth. Further discussion regarding how the decision engine 500 decides upon the appropriate set of content encodings is described further in regards to FIG. 5.

Once the decision engine 500 decides the set of required content encodings, the decision engine 500 retrieves the required video and audio encoders, separately encodes the video and audio, and generates an encoded composite stream for distribution. In various embodiments, the decision engine 500 receives requests to access the composite stream from client devices 110. For each received request, the decision engine 500 can identify certain characteristics (e.g. resolution of the screen, operating system, etc.) of the client device 110 that sent the request, and selects an appropriately encoded composite stream to be transmitted to the client device 110. The decision engine 500 distributes the encoded composite video 250 and the encoded composite audio 260 to client devices 110 through the network 120.

Example Process for Generating a Composite Stream

Figure 4:
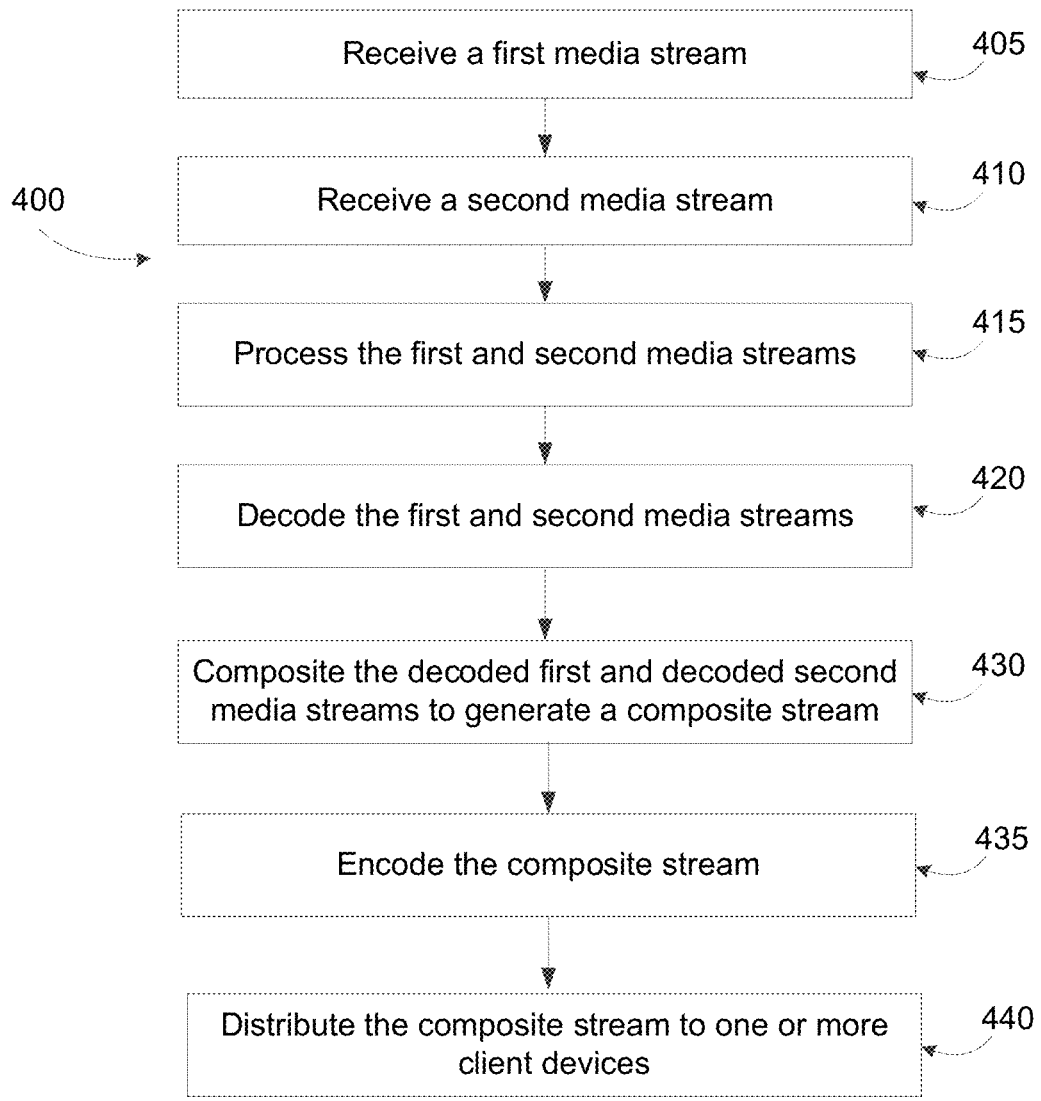
FIG. 4 illustrates a flow chart of generating a composite stream by the online system, in accordance with an embodiment.

FIG. 4 illustrates a flow chart 400 of generating and distributing a composite stream to one or more client devices, in accordance with an embodiment. The online system 130 receives 405 a first media stream 305 from a first media stream source 105A and receives 410 a second media stream 310 from a second media stream source 105B. The first media stream 305 and second media stream 310 may each have video (e.g., video frames) and audio data (e.g., audio frames).

The media stream protocol module 215 processes 415 the first 305 and second media streams 310 according to network protocols used to transmit the first media stream 305 and the second media stream 310. In various embodiments, the media stream protocol module 215 processes the streams according to real time transport protocol (RTP) over user datagram protocol (UDP). For example, if the media stream is a live stream by a user, the online system 130 ensures that the stream occurs smoothly with limited interactions so that the viewer experience is not disrupted. Therefore, RTP over UDP ensures that the live stream occurs in real-time even if occasional data packets are lost.

The decoder module 220 decodes 420 the first video 205A, first audio 205B, second video 210A, and second audio 210B according to the appropriate decoders. In various embodiments, the appropriate decoders are determined by the decoder module 220 based on a data that includes information as to the encoders that were previously used to encode each of the first video 205A, first audio 205B, second video 210A, and second audio 210B. For example, the data may be included as a header file that describes a media stream (e.g., payload type of data packets of video and audio, type of an encoder) through the RTP process.

Once decoded, the stream assembly module 225 composites 430 the first 305 and second 310 media streams into a composite stream. In some embodiments, the stream assembly module 225 may access time 315 information associated with video 1 (320A), audio 1 (320B), video 2 (325A), and audio 2 (325B). In doing so, the stream assembly module 225 aligns the video frames of video 1 (320A) and video 2 (325A) streams according to the time 315 information. Additionally, the stream assembly module 225 aligns an audio excerpt from the audio 1 (320B) and audio 2 (325B).

In some embodiments, the stream assembly module 225 further adjusts the video frames from video 1 (320A) and video 2 (325A). For example, the stream assembly module 225 may identify that a picture-in-picture configuration of the composite stream 250 is desired. In other words, the video frame of the video 2 (325A) is to be overlaid on top of a video frame of video 1 (320A) or vice versa. One or both of the video frames may undergo adjustments (e.g. cropping, change in resolution) in order generate the composite video.

The decision engine 500 encodes 435 the composite video and composite audio to generate an encoded composite stream 350. For example, the decision engine 500 encodes the composite video using a video encoder (for example, H.264) and encodes the composite audio using an audio encoder (for example, AAC). In some embodiments, the decision engine 500 encodes the composite stream based on characteristics of the media stream source 105 that generated the original stream. For example, if the optical device on the first or second media stream source 105A or 105B is not capable of recording 4K video, the decision engine 500 will not select a 4K video encoder to encode the composite video data. The decision engine 500 distributes 440 the encoded composite stream 350 including the encoded composite video 250 and encoded composite audio 260 to one or more client devices 110 for viewing by a user of the client device 110.

Decision Engine for Encoding the Composite Stream

Figure 5A:
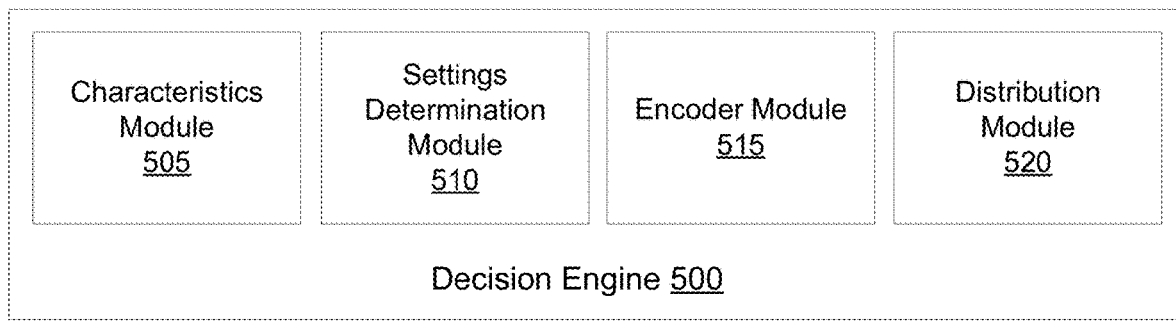
FIG. 5A depicts the system architecture of the decision engine of the online system, in accordance with an embodiment.

FIG. 5A depicts a diagram of the decision engine 500 of the online system 130, in accordance with one embodiment. The decision engine 500 determines the appropriate encoders that will be utilized by the encoder module 230 to encode the composite stream. This is beneficial because given that encoding audio and video is an expensive computing process, only encoding the composite stream using the necessary encodings can reduce the resources (e.g. processor power, memory, time) required to separately encode the medial streams that are used to generate the composite stream. The decision engine 500 generates a set of composite streams with different content configurations (e.g., different resolutions, different bit rates and frame rates, etc.,) and distributes an encoded composite stream that is appropriate to playback to a client device 110. In various embodiments, the decision engine 500 includes a characteristics module 505 and a settings determination module 510.

Characteristics for Deciding Appropriate Encodings for the Composite Stream

The characteristics module 505 may receive a variety of characteristics associated with the composite stream in order to determine the appropriate set of content encodings for the composite stream. As a first example, the characteristics may be associated with the first media stream source 105A or second media stream source 105B. More specifically, the characteristics can be intrinsic characteristics of the first media stream source 105A and the second media stream source 105B. Intrinsic characteristics may include the camera resolution of both media stream sources that limits the video resolution that can be generated by each media stream source 105. If the streams from the first and second media stream sources 105 are each captured with a low resolution (e.g. 480p), then the composite stream should not be encoded with an encoder configured for 1080p or 4k resolution video. In order to obtain the intrinsic characteristics of a media stream source 105, the characteristics module 505 may receive device identifiers that identify the device of the first media stream source 105A and second media stream source 105B. Thus, the characteristics module 505 can identify each device's hardware specifications (e.g. camera megapixels), operating system, and other information that may be informative in deciding the appropriate set of encodings for the composite stream. In another example, the characteristics may be a user-selected setting (e.g. 720p or 1080p video resolution, audio bitrate) that was used by the first or second media stream source 105A or 105B.

In various embodiments, the characteristics associated with the first media stream source 105A or second media stream source 105B are historical data associated with previous streams hosted by either the first media stream source 105A or second media stream source 105B. For example, one of the media stream sources 105 may be a host that was highly popular during previous streams and therefore, has many subscribers that would be interested in tuning in when the host is streaming new content. More generally, if a wide variety of client devices 110 traditionally access the stream provided by the first or second media stream source 105A or 105B, then the composite stream would also need a wide set of encodings to ensure that the wide variety of client devices 110 can appropriately access the stream. Additionally, the historical data may be used to categorize each media stream source 105. For example, a media stream source 105 may be ranked based on its popularity and categorized in the top 1%, 5%, 10%, or further of all media stream sources 105. The set of content encodings for the composite stream may be selected based on the categorization of the first 105A or second media stream sources 105B. For example, if either of the first 105A or second media stream sources 105B is in the top 1% in terms of popularity, then the set of content encodings is selected to include all possible content encodings to ensure that all client devices 110 that access the composite stream can receive an appropriately encoded composite stream.

As a second example, the characteristics include social graph information of the first or second individual that utilizes the first media stream source 105A and second media stream source 105B. For example, in order to transmit a live stream to the online system 130, a user of the first media stream source 105A and a user of the second media stream source 105B must first login to the online system 130. Thus, in doing so, the characteristics module 505 receives the social graph information of each user that is generating the stream. Social graph information may provide an indication as to the user's popularity and may include the user's total number of friends and the number of likes and/or comments that the user has previously received on user-provided content.

In a third example, the characteristics include the characteristics of the one or more client devices 110 that have requested to access the composite stream 350. For example, the characteristics module 505 may receive a request from a client device 110 that includes information that allows for identification of characteristics (e.g. screen resolution, operating system) of the client device 110. The characteristics of the client devices 110 are used to ensure that each client device 110 can appropriately decode and playback the composite stream. In another embodiment, the characteristics associated with the client device 110 may be a geographical location of the client device 110. For example, if the vast majority of client devices 110 that are attempting to access a stream originate from a location that does not have the wireless infrastructure to transmit high quality composite streams (e.g. 4k video resolution, high audio bitrate), then the set of content encodings can be selected accordingly.

As a fourth example, the characteristics module 505 may receive characteristics regarding the composite stream. For example, a characteristic can be the length of the composite stream. If the composite stream is short, then the encoding process to be employed by the online system 130 would require significantly less resources (e.g. time, computational resources) in comparison to longer composite streams.

Therefore, composite streams below a certain length may be encoded to generate a wider set of content encodings given the lower expense in generating additional content encodings. Another characteristic of the composite stream can be an identification of the content in the content stream. The online system 130 can employ a machine learning model that identifies the subject matter of a composite stream. This is helpful for deciding an optimal set of content encodings because a composite stream that is tagged as a "National Football League (NFL) sporting event" would be highly relevant to a wide number of viewers. Therefore, a wider set of encodings can be selected.

Selecting the Appropriate Encoders

The settings determination module 510 receives the characteristics retrieved by the characteristics module 505 and determines the appropriate set of content encodings for the composite stream. In order to do so, the settings determination module 510 may apply a variety of techniques.

In one embodiment, the settings determination module 510 considers the various characteristics received from the characteristics module 505 to filter out content encodings that would be inappropriate for the composite stream. For example, the settings determination module 510 filters out all content encodings that would be incompatible with the characteristics associated with the first media stream source 105A and second media stream source 105B. As previously described, if either of the first media stream source 105A or second media stream source 105B captured their respective streams at 4k video resolution, the settings determination module 510 eliminates all content encodings that are of higher video resolution (e.g. 5k, 8k resolution).

As another example, the settings determination module 510 may also filter out content encodings that would be incompatible with characteristics of the client devices 110 that are requesting to access the stream. Thus, if the client devices 110 that are requesting to access the stream are mobile devices with a maximum display resolution of 1080p, the settings determination module 510 eliminates content encodings of higher video resolutions (e.g. 4k, 5k, 8k resolution).

As another example, the settings determination module 510 can filter out encodings based on the historical data associated with the first media stream source 105A or second media stream source 105B. The settings determination module 510 can receive information regarding the popularity of the first media stream source 105A and second media stream source 105B that indicates the set of encodings that were used to encode previous streams that were hosted by the first media stream source 105A and second media stream source 105B. For example, if the settings determination module 510 previously evaluated streams that were received from the first 105A or second media stream source 105B and decided that a small subset of content encodings was necessary, then the settings determination module 510 can similarly identify the same small subset of content encodings as the optimal set for this current composite stream. In other words, the settings determination module 510 eliminates encodings that are unlikely to be used for the composite stream.

The aforementioned examples for filtering out content encodings may be applied by the settings determination module 510 individually or in combination with one another. For example, the settings determination module 510 can decide that only one characteristic is necessary to filter out content encodings. If a first media stream source 105A and second media stream source 105B have conducted joint streams (e.g. composite streams) numerous times in the past, the settings determination module 510 can choose to only consider historical data associated with the media stream sources 105 because the settings determination module 510 is familiar with this pair of stream sources. In another embodiment, the settings determination module 510 may apply the various characteristics received from the characteristics module 505 to sequentially filter out content encodings in order to arrive at the optimal set of content encodings.

In various embodiments, the settings determination module 510 receives characteristics from the characteristics module 505 and maps the received characteristics to an optimal set of content encodings. For example, the settings determination module 510 receives information regarding the ranked popularity of the first media stream source 105A and second media stream source 105B. If either of the media stream sources 105A and 105B are above a threshold popularity (e.g. in the top 5% of stream hosts), the settings determination module 510 maps this information to a set of content encodings. In this case, the set of content encodings may be selected as all possible content encodings to ensure that all encodings of the composite stream are available to be distributed to a wide variety of client devices 110. Alternatively, if both media stream sources 105A and 105B are below a threshold popularity (e.g. both rank in bottom 50% of stream hosts in popularity), then the settings determination module 510 can map this information to a subset of content encodings from all possible content encodings.

In other embodiments, the settings determination module 510 employs a machine learning model to identify the optimal set of content encodings. The settings determination module 510 can train the machine learning model using machine learning techniques and algorithms that include, but are not limited to, neural networks, naïve Bayes, support vector machines and machine learning used in HIVE™ frameworks. The machine learning model receives, as inputs, the various characteristics from the characteristics module 505 and outputs an optimal set of content encodings for the composite stream that is determined based on the input characteristics.

The machine learning model can be trained to assign differing weights to each of the input characteristics. For example, the machine learning model can be trained to more heavily weigh the characteristics associated with the media stream sources 105 (e.g. intrinsic characteristics of the device hardware) in comparison to characteristics associated with the composite stream itself (e.g. content of composite stream, length of composite stream). Therefore, the characteristics associated with the media stream sources 105 can far more heavily impact the final set of content encodings in comparison to characteristics of the composite stream.

The settings determination module 510 can continuously retrain the machine learning model based on feedback that it receives regarding the encoded composite stream. For example, the machine learning model may decide that a composite stream should be encoded using a wide variety of encoders. However, if a large number of the encoded composite streams are not utilized (e.g. distributed to client devices 110) or if they suffer from poor performance when they are delivered (e.g. high latency or buffering situations), the settings determination module 510 can retrain the machine learning model to adjust the weights associated with the characteristics to minimize the wasted encoded composite streams.

Encoding and Distributing the Composite Stream

Once the setting determination module 510 decides on the set of content encodings for the composite stream, the encoder module 515 retrieves the appropriate encoders and encodes the composite stream to generate each content encoding in the optimal set of content encodings. For each content encoding, the encoder module 515 encodes the composite video stream and the composite audio stream separately. The encoder module 515 may further associate metadata information with each encoded video and encoded audio composite streams, the metadata information describing the encoding that was used such that the client devices 110 can readily decode the streams accordingly for playback.

In various embodiments, the encoder module 515 finishes encoding portions of the composite stream as it is generated and stores the encoded portions. For example, the encoder module 515 may cache the encoded portions to ensure that they can rapidly be delivered to a client device 110 upon request. For example, the encoded portions of the composite stream may undergo HTTP caching and be temporarily stored in a content distribution network (CDN).

The distribution module 520 is responsible for delivering the appropriate encoded composite video 250 and composite audio 260 to the correct client device 110 such that the client device 110 can appropriately decode and playback the composite video 250 and audio 260. For example, the distribution module 520 may receive the characteristics (e.g. resolution of screen) of the client device 110 previously received by the characteristics module 505. Thus, if the client device 110 has a 1080p resolution touchscreen, then the distribution module 520 may choose to distribute an encoded video 250 that was encoded for 1080p playback.

In various embodiments, the distribution module 520 sends the encoded composite video 250 and encoded composite audio 260 as data packets according to standard protocols such as RTMP over TCP. In other scenarios, the distribution module 520 can employ RTP over UDP procedures.

In various embodiments, the distribution module 520 may monitor the performance of a composite stream and provide feedback to the settings determination module 510 of the decision engine 500 to alter the set of encodings that have been selected for a particular composite stream. For example, the selected set of encodings for a composite stream may have been previously selected by the settings determination module 510 to be a relatively small set due to the previously described characteristics. However, the distribution module 520 may distribute the composite stream and realize that the composite stream is rapidly increasing in popularity (e.g. going viral). Thus, the distribution module 520 may inform the settings determination module 510 of the positive performance of the composite stream. Thus, the settings determination module 510 may choose to reevaluate and broaden the set of encodings to include additional encodings to ensure that the client devices 110 that are partaking in the virility of the composite stream can appropriately access the stream.

Process for Encoding and Distributing Composite Streams

Figure 5B:
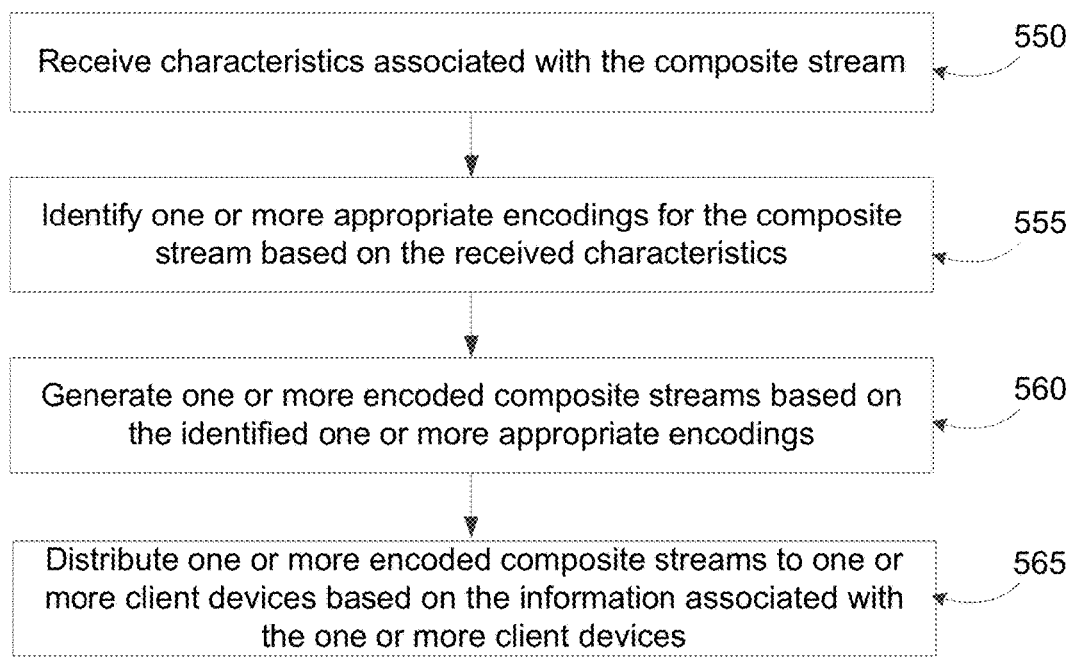
FIG. 5B illustrates a flow process for appropriately encoding and distributing a composite stream by the decision engine, in accordance with an embodiment.

FIG. 5B illustrates a flow process for the processes conducted by the decision engine 500 for identifying the optimal set of content encodings for a composite stream, encoding the composite stream, and selecting/distributing an encoded composite stream to a client device 110 for viewing, in accordance with an embodiment.

The decision engine 500 receives 550 characteristics associated with the composite stream to be used to determine the optimal set of content encodings. As previously stated, these characteristics may be characteristics of the first 105A or second media stream sources 105B or characteristics of the one or more client devices 110 that are requesting to access the composite stream. Based on the characteristics, the decision engine 505 identifies 555 a set of content encodings for encoding the composite stream. Thus, the decision engine 505 generates 560 each encoded composite stream identified in the set of content encodings. In various embodiments, the decision engine 505 stores (e.g. caches) the encoded composite streams such that each encoded composite stream can be rapidly delivered to a client device 110 for an optimal viewing experience (e.g. minimal latency or buffering issues). The decision engine 500 distributes 565 the encoded composite streams to client devices 110 based on information associated with the client device. For example, if a client device is operating on a particular platform (e.g. iOS™ or Android™), the decision engine 500 transmits an encoded composite stream that can be appropriately played back using the particular platform.

Software Module of Client Device

Figure 6:
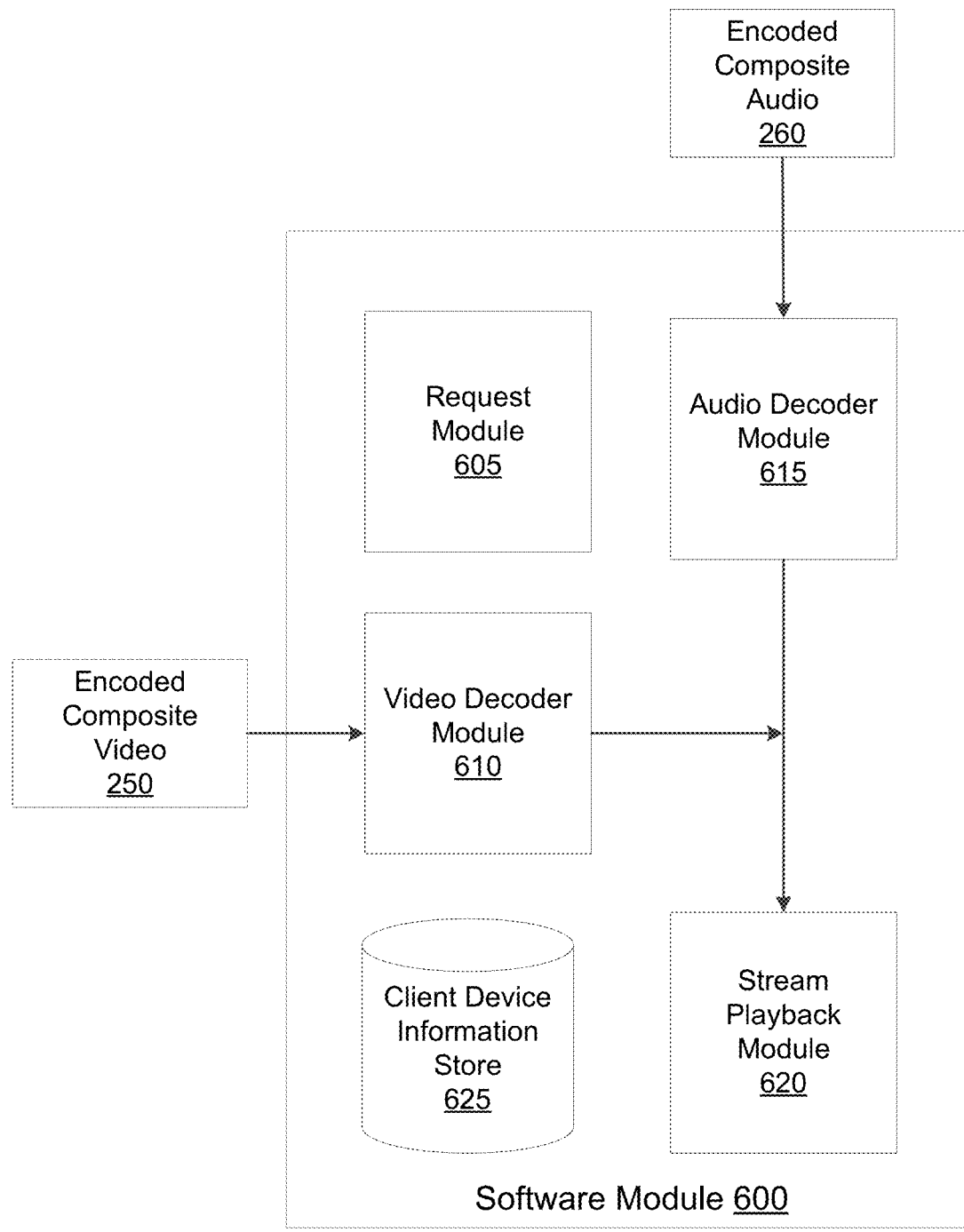
FIG. 6 shows a software module on the client device for playing back a composite stream, in accordance with an embodiment.

FIG. 6 depicts a software module 600 on the client device 110, in accordance with an embodiment. The software module 600 is configured to receive and playback the received composite stream including the composite video 250 and composite audio 260. In various embodiments, the software module 600 includes a request module 605, a video decoder module 610, an audio decoder module 615, and a stream playback module 620.

The request module 605 sends a request to the online system 130 in order to access a composite stream 360. In various embodiments, the request is sent in response to a received user input. For example, a user of the client device 110 may provide a selection or an indication (e.g. a touch or click) on the user interface 112 that specifies that the user would like to access the composite stream. This user input causes the request module 605 to send the request to the online system 130. In another embodiment, the request module 605 receives an invitation from a host of a media stream for participating in the media stream. The request module 605 provides the invitation to the user of the client device, e.g., displaying on a user interface of the client device 110. Upon receiving an acceptance to the invitation from the user, the request module 605 informs the host the user's acceptance.

In various embodiments, the request module 605 sends additional information associated with the request to the online system 130. For example, the request module 605 can retrieve information regarding the client device 110 from the client device information store 625. This additional information may include a device identifier that identifies the client device 110 or information regarding the hardware specifications (e.g. screen resolution, operating platform) of the client device 110. As previously described, this additional information send in association with the request can help the decision engine 500 of the online system 130 in deciding the appropriate encodings that are needed for a composite stream. In other embodiments, the additional information retrieved from the client device information store 625 may be sent to the online system 130 at a different time and need not be sent concurrently with the request for the composite stream 360. For example, the additional information of the client device 110 can be sent to the online system 130 when the client device 110 first accesses the online system 130 (e.g. when the user first logs in to access the online system 130).

In various embodiments, following the request sent by the request module 605, the software module 600 receives, from the online system 130, the composite stream 360 which separately includes the composite video 250 and the composite audio 260. The composite video 250 is processed by the video decoder module 610 whereas the composite audio 260 is processed by the audio decoder module 615. Each of the composite video 250 and composite audio 260 possesses associated metadata information that enables the video decoder module 610 and audio decoder module 615 to appropriately decode the composite video 250 and composite audio 260, respectively.

The stream playback module 620 receives the decoded composite video and decoded composite audio and displays the composite stream on a user interface 112 of the client device 110 for consumption by the user of the client device 110. In various embodiments, the stream playback module 620 further monitors the performance of the composite stream. For example, if the composite stream is suffering from latency and/or buffering issues, the playback module 620 may instruct the request module 605 to send information to the online system 130. Thus, the decision engine 500 of the online system 130 can readily alter the set of encodings needed for the composite stream or distribute a differently encoded composite stream (e.g. lower video resolution) to the client device 110 in order for more effective playback.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, from a first source representing a first user of a social networking system, a live broadcast of a first media stream;
   receiving, from a second source representing a second user of the social networking system, a second media stream;
   generating a composite stream by compositing the second media stream with the first media stream;
   accessing historical data of the first user and the second user that describes views of previous streams hosted by the first user and views of previous streams hosted by the second user;
   selecting a set of encoders, wherein the encoders in the selected set is based on the historical data;
   encoding the composite stream into content encodings using the selected set of encoders, each content encoding comprising information describing presentation orientation of the first media stream with respect to presentation orientation of the second media stream; and
   broadcasting, to one or more client devices, one of the content encodings.

2. The method of claim 1, wherein the historical data comprises data indicating types of client devices that have previously viewed media streams hosted by the first user and data indicating types of client devices that have previously viewed media streams hosted by the second user, such that the set of content encoders is selected to ensure all client devices of users accessing the composite stream can receive the encoded composite stream.

3. The method of claim 1, wherein the historical data comprises popularity data, the popularity data indicating the popularity of previous media streams of at least one of the first user and the second user.

4. The method of claim 1, wherein generating a composite stream by compositing the second media stream with the first media stream comprises:
   receiving an indication from the first source that the second source has accepted an invitation from the first source;
   decoding the first media stream and the second media stream;
   determining one or more required settings for the composite stream; and
   adjusting the decoded first media stream and the decoded second media stream to meet the required settings of the composite stream.

5. The method of claim 4, wherein the determined one or more required settings for the composite stream comprises a final resolution of a video from the first media stream and a video from the second media stream.

6. The method of claim 1, wherein generating a composite stream by compositing the second media stream with the first media stream comprises:
   decoding the first media stream and the second media stream;
   identifying timing information associated with a video frame of the decoded first media stream and timing information associated with a video frame of the decoded second media stream; and
   aligning the video frame of the decoded first media stream with the video frame of the decoded second media stream based on their associated identified timing information.

7. The method of claim 6, wherein aligning the video frame of the decoded first media stream with the video frame of the decoded second media stream based on their associated identified timing information further comprises:
   determining a difference between the timing information associated with the video frame of the decoded first media stream and the timing information associated with the video frame of the decoded second media stream.

8. The method of claim 7, further comprising:
   responsive to the determined difference being below a threshold difference:
      adjusting the timing information associated with one of the video frame of the decoded first media stream or the video frame of the decoded second media stream; and
      altering timing information associated with either an audio excerpt from the decoded first media stream or an audio excerpt from the decoded second media stream to reflect the adjusted timing information associated with one of the video frame of the decoded first media stream or the video frame of the decoded second media stream.

9. The method of claim 7, further comprising:
   responsive to the determined difference being above a threshold difference, identifying timing information associated with a subsequent video frame of the first media stream; and
   determining a difference between the timing information associated with the subsequent video frame of the decoded first media stream and the timing information associated with the video frame of the decoded second media stream.

10. The method of claim 1, wherein the composite stream comprises a plurality of composite video frames, and each composite video frame comprises a video frame from the second media stream displayed within a corresponding video frame from the first media stream.

11. The method of claim 1, wherein the first media stream comprises a first audio and a first video and the second media stream comprises a second audio and a second video.

12. A method comprising:
   receiving, from a first source representing a first user of a social networking system, a live broadcast of a first media stream comprising a first video and a first audio, the first user of the social networking system being a host of the live broadcasting stream;
   broadcasting the first media stream to one or more client devices;
   receiving, from a second source representing a second user of the social networking system, a second media stream comprising a second video and a second audio, the second user being a guest of the host of the live broadcasting stream;
   generating a composite stream by compositing the second media stream with the first media stream;
   accessing intrinsic characteristics describing properties of one or more of the first video, the first audio, the second video, and the second audio;
   selecting a set of encoders, wherein the encoders are selected based on the intrinsic characteristics;
   encoding the composite stream into content encodings using the selected set of encoders, each content encoding comprising information describing presentation orientation of the first media stream with respect to presentation orientation of the second media stream; and
   broadcasting, to one of the one or more client devices, one of the content encodings.

13. The method of claim 12, wherein generating a composite stream by compositing the second media stream with the first media stream comprises:
   receiving an indication from the first source that the second source has accepted an invitation from the first source;
   decoding the first media stream and the second media stream;
   determining one or more required settings for the composite stream; and
   adjusting the decoded first media stream and the decoded second media stream to meet the required settings of the composite stream.

14. The method of claim 13, wherein the determined one or more required settings for the composite stream comprises a final resolution of a video from the first media stream and a video from the second media stream.

15. The method of claim 12, wherein generating a composite stream by compositing the second media stream with the first media stream comprises:
   decoding the first media stream and the second media stream;
   identifying timing information associated with a video frame of the decoded first media stream and timing information associated with a video frame of the decoded second media stream; and
   aligning the video frame of the decoded first media stream with the video frame of the decoded second media stream based on their associated identified timing information.

16. The method of claim 15, wherein aligning the video frame of the decoded first media stream with the video frame of the decoded second media stream based on their associated identified timing information further comprises:
   determining a difference between the timing information associated with the video frame of the decoded first media stream and the timing information associated with the video frame of the decoded second media stream.

17. The method of claim 16, further comprising:
   responsive to the determined difference being below a threshold difference:
      adjusting the timing information associated with one of the video frame of the decoded first media stream or the video frame of the decoded second media stream; and
      altering timing information associated with either an audio excerpt from the decoded first media stream or an audio excerpt from the decoded second media stream to reflect the adjusted timing information associated with one of the video frame of the decoded first media stream or the video frame of the decoded second media stream.

18. The method of claim 16, further comprising:

responsive to the determined difference being above a threshold difference, identifying timing information associated with a subsequent video frame of the first media stream; and determining a difference between the timing information associated with the subsequent video frame of the decoded first media stream and the timing information associated with the video frame of the decoded second media stream.

19. The method of claim 12, wherein the composite stream comprises a plurality of composite video frames, and each composite video frame comprises a video frame from the second media stream displayed within a corresponding video frame from the first media stream.

20. The method of claim 12, wherein the selection of encoders is further based on historical data describing views of previous streams hosted by the first user.

* * * * *